INVENTOR:
MARTIN G. GABRIEL
BY
ATTORNEYS

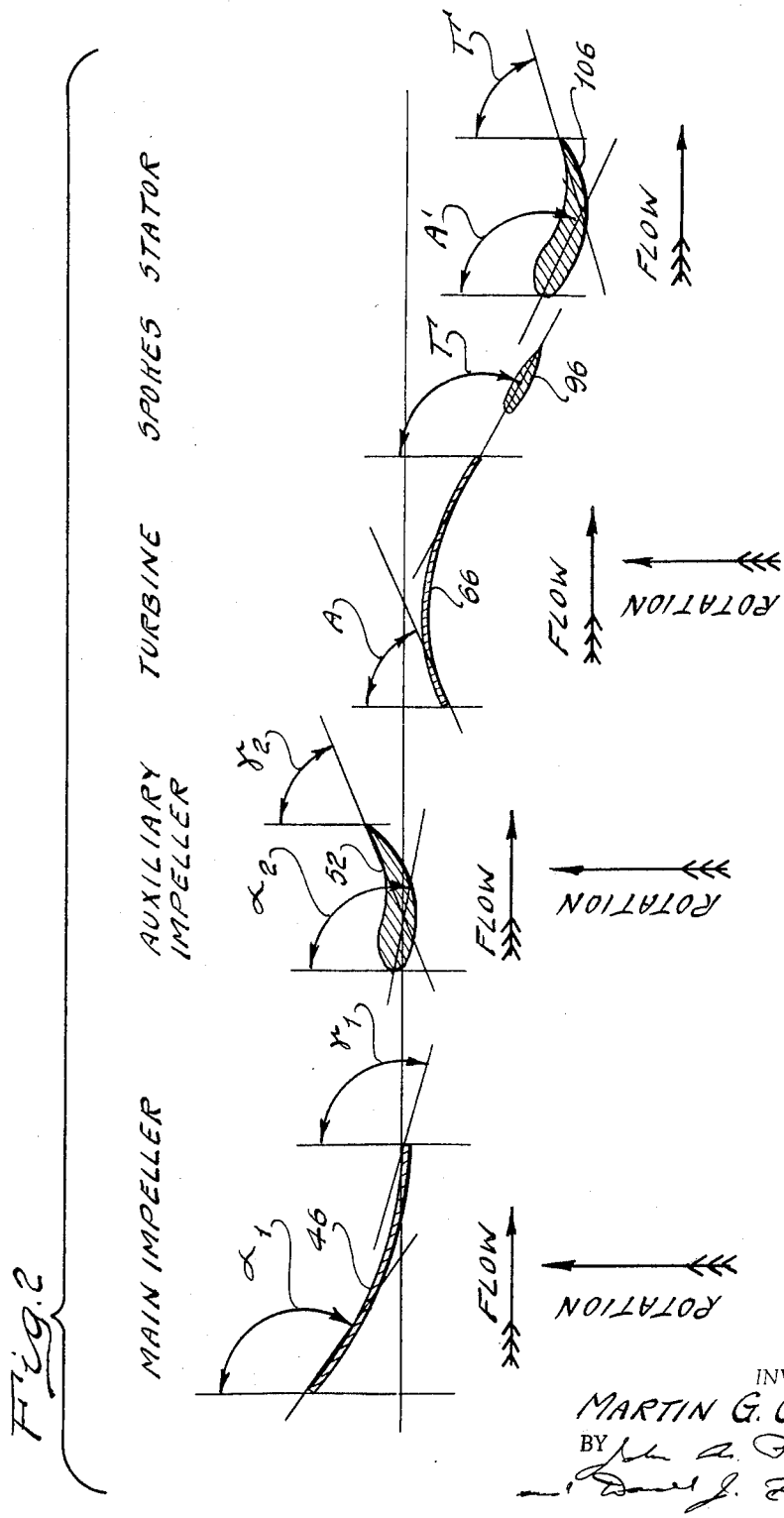

United States Patent Office 3,282,129
Patented Nov. 1, 1966

3,282,129
MULTIPLE SPEED RATIO HYDROKINETIC POWER TRANSMISSION MECHANISM
Martin G. Gabriel, Dearborn, Mich., assignor to Ford Motor Company, Dearborn, Mich., a corporation of Delaware
Filed Dec. 31, 1963. Ser. No. 334,882
4 Claims. (Cl. 74—677)

My invention relates generally to hydrokinetic torque converter power transmission mechanisms, and more particularly to a hydrokinetic power transmission mechanism including a torque converter unit with two operating performance ranges.

In my copending United States patent application, Serial No. 247,222, I have disclosed a power transmission mechanism having a pair of simple planetary gear units and a hydrokinetic torque converter mechanism with a compound impeller assembly. This assembly includes a primary bladed portion that is connected to the vehicle engine in an automotive vehicle driveline. An auxiliary impeller is situated at the flow exit region of the primary impeller blades. The auxiliary impeller may be clutched to the main impeller to condition the converter for high efficiency operation in the high speed ratio range and for optimum cruising performance operation. The auxiliary impeller clutch structure can be released to alter the effective blade geometry of the impeller assembly and thus condition the converter for maximum torque ratio performance.

During both low speed ratio forward drive operation and intermediate speed ratio forward drive operation, the torque converter unit defines in part the torque delivey path from the engine to the power output shaft. The clutch structure associated with the auxiliary impeller is effective, however, to establish a direct mechanical connection between the engine and a first power input element of the gear system while the balance of the power is distributed hydrokinetically through a driving connection between the converter turbine and a second power input element of the gear system. The split torque delivery path thus provided increases the cruising efficiency of the mechanism.

During reverse drive operation the connection between the turbine and the first power input element is interrupted by a selectively engageable friction clutch, but the mechanical power delivery path remains active.

My improved arrangement, in contrast with my earlier arrangement, utilizes the turbine as a hydrokinetic power delivery member during reverse drive operation as well as during forward drive operation. In this way I have introduced a second power delivery path that acts in series with the fully mechanical torque delivery path between the engine and gear system during reverse drive.

The provision of an improved power transmission mechanism of the type above set forth being a principal object of my invention, it is a further object of my invention to provide a hydrokinetic power transmission mechanism having a torque converter with an auxiliary impeller that functions as a portion of a mechanical torque delivery path during reverse drive operation and which functions as a hydrokinetic torque delivery member during forward drive operation.

It is a further object of my invention to provide a power transmission mechanism of the type above set forth wherein the turbine of the torque converter unit may be coupled to the auxiliary impeller during reverse drive operation by means of an overrunning one-way clutch structure.

Other objects and features of my invention will become apparent from the following description and from the accompanying drawing, wherein:

FIGURE 2 shows in diagrammatic form a portion of a blade cascade diagram for the blading of the torque converter of FIGURE 1.

Figure 1:
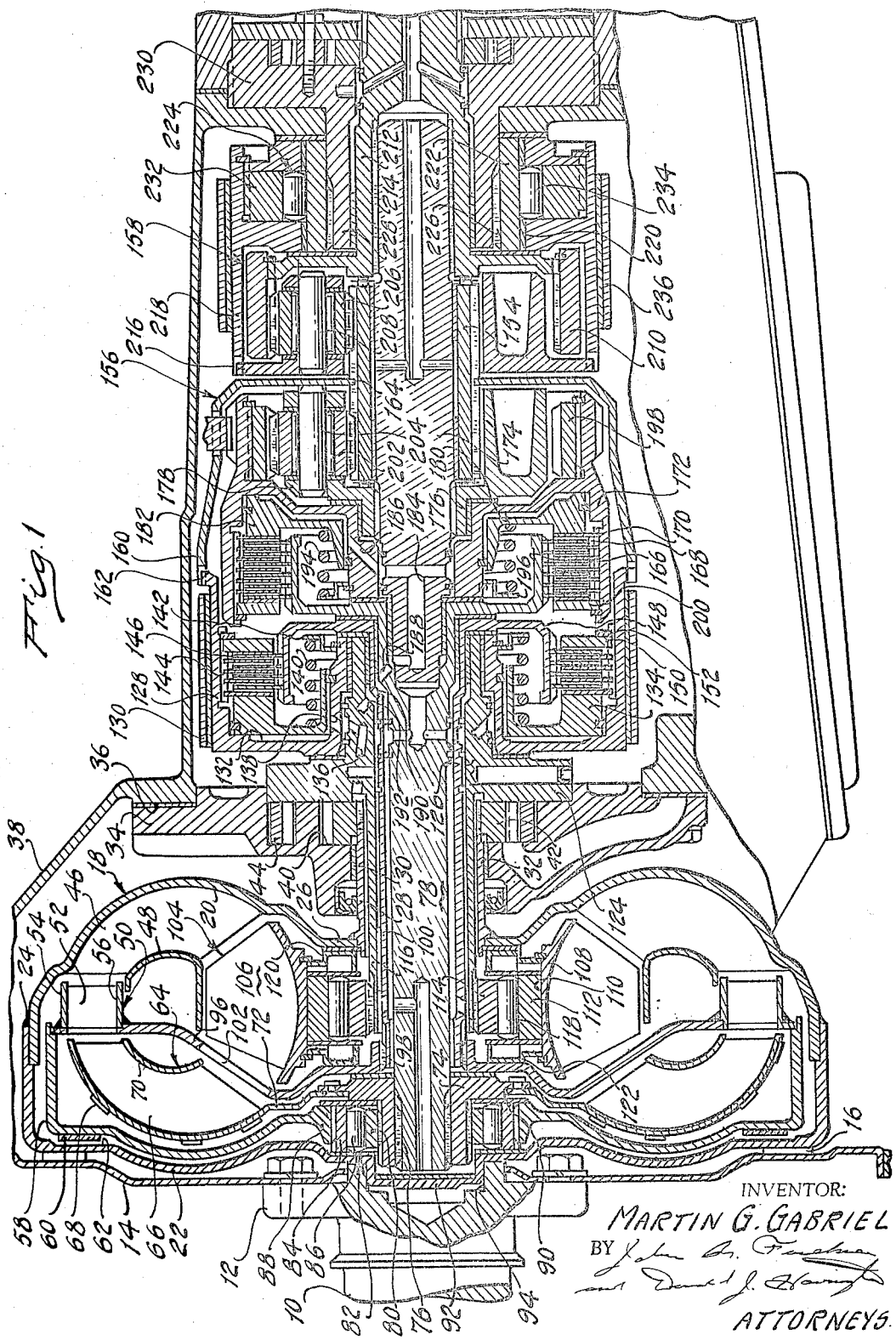
FIGURE 1 shows in longitudinal cross sectional form a power transmission mechanism embodying the features of my invention.

Referring first to FIGURE 1, numeral 10 designates generally a portion of the crankshaft of an internal combustion engine in an automotive vehicle driveline. It is flanged at 12 to permit a bolted connection with the converter drive plate 14. This plate is bolted or otherwise secured at 16 to an impeller shell 18. The shell 18 includes a first part 20 having a generally toroidal shape and a second part 22 situated adjacent the drive plate 14. The shell parts 20 and 22 are secured together by a peripheral weld 24.

Shell part 20 includes a hub 26 which is welded to a sleeve shaft 28. The shaft 28 is journaled by means of a bushing 30 within a bearing opening 32 formed in a transmission wall 34. The periphery of the wall 34 is secured by welding to an inner boss 36 formed in transmission housing 38.

A marginal portion of the housing 38 can be bolted to the engine block of the internal combustion vehicle engine.

Wall 34 is formed with a pump chamber 40 within which is positioned positive displacement pump gears 42 and 44. Gear 42 functions as a driving element and is keyed or otherwise drivably connected to sleeve shaft 28. The positive displacement pump defined by the elements 42 and 44 thus is capable of developing a control pressure whenever the engine is in operation.

Secured within the impeller shell part 20 are impeller blades 46. An inner impeller shell 48 is secured to the inner margin of the blades 46 and it cooperates with the blades to define radial outflow passages.

Disposed at the flow exit region of the impeller blades 46 is an auxiliary impeller 50. The auxiliary impeller includes auxiliary impeller blades 52, an outer shroud 54 and an inner shroud 56. The blades 52 define axial flow passages that form continuations of the radial outflow passages defined by the blades 46 of the impeller. Shroud 54 of the auxiliary impeller 50 is connected to a friction clutch member 58 which extends radially inwardly adjacent the inner surface of shell part 22. It carries a friction clutch disc 60 adjacent its outer periphery. This disc is disposed directly adjacent a cooperating friction surface 62 formed on the impeller shell part 22.

A hydrokinetic turbine is shown at 64. It includes turbine blades 66 that define radial inflow passages communicating with the passages of the auxiliary impeller blades 52. An outer turbine shroud 68 is secured to the outer margins of the blades 62. An inner shroud 70 which is secured to the inner margins of the blades 66, cooperates with the blades to define in part the turbine torus flow passages.

Shroud 68 is formed with a hub 72 which is riveted or otherwise secured to a hub member 74. This member is splined at 76 to a turbine shaft 78. An overrunning clutch inner race 80 also is splined to the hub 74. It forms a part of an overrunning clutch assembly identified generally by reference character 82.

Assembly 82 includes an outer race 84 and a series of clutch rollers 86 that are disposed between the races 80 and 84. One of these races can be cammed to cooperate with the rollers 82 to provide one-way clutching action between the races although freewheeling motion in the opposite direction is permitted.

Races 84 are splined or keyed to the inner periphery 88 of clutch member 58.

Races 80 and 84 are disposed between shell part 22 and the hub member 74. A thrust washer 90 accommodates relative motion between the races and the hub member 74.

The hub of shell part 22 defines a pilot portion 92 which is received within a pilot opening 94 formed in the end of crankshaft 10.

The inner shroud 56 is connected to torque transfer member 96 which is splined at 98 to a torque delivery sleeve shaft 100 journaled for rotation about turbine shaft 78. Torque transfer member 96 includes a web portion 102 which is situated within the torus circuit of the converter. This portion 102 defines spokes that are in the form of double cambered blades that are circumferentially spaced about the axis of the converter thereby providing a minimum amount of resistance to the torus flow in the torus region between the flow exit section of the turbine 64 and the flow entrance section of the stator.

The stator is indicated generally in FIGURE 1 by reference character 104. It includes stator blades 106 carried by a stator shroud 108. This shroud is formed with a central opening 110 within which is positioned an overrunning brake outer race 112.

An overrunning brake inner race 114 is splined to a stationary stator sleeve shaft 116 situated about the sleeve shaft 100. Overrunning brake elements in the form of rollers 118 are situated between the races 112 and 114. One of these races can be cammed to cooperate with the rollers 118 and to inhibit rotation of the stator 104 in the direction of rotation of the impeller, although freewheeling motion in the opposite direction is permitted.

The races for the overrunning brake and the rollers 118 are held axially fast by means of spacer elements 120 and 122 situated on either axial side of the stator hub.

Stator shaft 116 is connected integrally to an adaptor 124 which is secured to the wall 34. This adaptor includes an extension 126 upon which is journaled a brake drum 128. A friction brake band 130, which surrounds drum 128, may be applied and released by means of a suitable fluid pressure operated servo to anchor selectively the drum 128. Drum 128 defines an annular cylinder 132 within which is positioned an annular piston 134. The cylinder and piston cooperate to define a pressure chamber that is in fluid communication with a pressure feed passage 136 formed in the adaptor 124. This communication is established by one or more fluid supply ports 138 formed in the drum 128.

A clutch piston return spring 140 is disposed between the piston 134 and a spring seat member 142 carried by the drum 128.

Externally splined friction clutch discs 144 are carried by an internally splined portion of the drum 128. They are situated in interdigital relationship with respect to internally splined clutch discs 146 carried by an externtlly splined clutch member 148. This member is connected to or formed integrally with sleeve shaft 100.

A clutch disc back-up ring 150 is carried by the internally splined drum 128 and held axially fast by a snap ring 152.

Upon introduction of fluid pressure to the cylinder 132, the piston 134 urges the discs 144 and 146 into frictional driving relationship thus establishing a driving connection between shaft 100 and drum 128.

Drum 128 is connected drivably to a sun gear element 154 which is common to each of two simple planetary gear units 156 and 158. This connection is established by a drive shell 160 which is connected by means of engageable dog clutch teeth 162 to the drum 128. The drive shell 160 is internally splined at its inner periphery 164 to permit a driving connection with the sun gear 154.

Turbine shaft 78 is formed integrally with a radially extending clutch element 166. It is externally splined to permit a driving connection with internally splined discs 168 which are situated in interdigital relationship with respect to externally splined clutch discs 170. These discs 170 are connected to an internally splined portion of a clutch drum 172.

The drum 172 is journaled for rotation upon intermediate torque delivery shaft 174 and upon extension 176 of a planetary carrier 178 for the gear unit 156.

A clutch plate back-up ring 200 is externally splined to the internally splined portion of drum 172 and held axially fast by a snap ring as indicated.

Gear unit 156 includes planet pinions 202 that are journaled for rotation upon pinion shafts 204 carried by the carrier 178. Pinions 202 engage drivably ring gear 198 and sun gear element 154.

The planetary gear unit 158 includes planet pinions 206 rotatably supported upon pinion shafts 208. These drivably engage ring gear 210 which in turn is connected drivably to power output shaft 212. The shaft 174 is splined at 214 to the shaft 212.

Pinion shafts 208 are supported by carrier 216 which is connected at its outer peripery to a rotatable brake drum 218. This drum is rotatably supported by bushings 220 upon an inner race member 222 for an overrunning reaction brake 224. The race 222 is splined at 225 to a stationary sleeve shaft extension 228 formed on the wall 230, the latter being bolted or otherwise secured to the housing 38.

Power output shaft 212 extends through the wall 230 and may be connected to the vehicle traction wheels through a suitable driveline arrangement.

The overrunning brake 224 includes an outer race 232 which is splined to a drum 218. This race 232 can be cammed to permit camming action with overrunning brake roller elements 234 and provide a one-way braking action which prevents rotation of the drum 218 in one direction while accommodating freewheeling motion thereof in the opposite direction.

A friction brake band 236, which surrounds brake drum 218, may be applied and released by means of suitable fluid pressure operated servo. When the brake band 236 is applied, rotary motion of the drum 218 in either direction is inhibited.

Referring next to FIGURE 2, I have illustrated a blade diagram in the form of an unwrapped blade cascade arrangement. The blading illustration in FIGURE 2 is represented in cross sectional form with the plane of the cross section coinciding with the mean streamline for the toroidal flow.

It will be apparent from FIGURE 2 that the entrance angle $\alpha$ for the main impeller is substantially greater than 90°. The exit angle $\gamma$ for the main impeller may be made substantially equal to the entrance angle $\alpha_1$ for the auxiliary impeller. The exit angle $\gamma_1$ for the auxiliary impeller is substantially less than the corresponding angle $\gamma$ for the main impeller.

The entrance angles for the turbine and stator are represented by the symbols A and $A^1$, respectively. The exit angles for the turbine and stator are shown at $\Gamma$ and $\Gamma^1$ respectively.

When the auxiliary impeller clutch shown in part at 60 and 62 is disengaged, the auxiliary impeller will float freely in the torus circuit and will not influence the direction of the fluid flow velocity vectors. Under these conditions the effective impeller assembly flow exit angle is substantially equal to the value $\gamma$. In contrast, if the clutch shown in part at 60 and 62 is engaged, the auxiliary impeller and the main impeller rotate in unison so that the effective flow exit angle for the impeller assembly will be equal to the value $\gamma_1$.

By changing the effective exit angle for the impeller assembly from a large value to a relatively smaller value, the converter size factor is decreased during operation in the torque conversion range at any given speed ratio. This results in a decrease in the effective torque ratio at that particular speed ratio, but the operating efficiency at higher speed ratios and during coupling operation of the converter is improved substantially. Thus, the converter can be conditioned for operation in either of two performance ranges depending upon whether the auxiliary stator clutch shown at 60 and 62 is engaged.

For a particular description of the hydrokinetics involved in obtaining a transition from one operating range to another, reference may be made to my copending application Serial No. 235,413.

To obtain low speed ratio forward drive operation, the clutch assembly shown in part at 170 and 168 is engaged. The vehicle engine, of course, causes the impeller assembly to establish toroidal fluid circulation in the torus. The resulting turbine torque is delivered through shaft 78 and through the engaged multiple disc clutch assembly to the ring gear 198. This causes the common sun gear 154 to rotate in a reverse direction. The carrier 216 acts as a reaction member since it is held from rotation by the overrunning brake 224. Ring gear 210 and power output shaft 212 then are driven in a forward direction at a reduced speed ratio.

The reaction torque acting upon the carrier 178 is delivered directly to shaft 174 and hence to the power output shaft 212 thus providing a split torque delivery path through the gear system.

If continuous operation in the low speed ratio is desired, brake band 236 can be applied. This inhibits rotation of the carrier in a free-wheeling direction and permits coast braking to take place.

To condition the mechanism for intermediate speed ratio or forward drive operation, the brake band 236 is released and the brake band 130 is applied while the multiple disc clutch assembly shown at 168 and 170 remains applied. The sun gears now act as a reaction element and the carrier 178 is driven at an increased speed as the ring gear 198 continues to act as a power input element.

The overrunning brake 224 overruns during intermediate speed ratio operation and the entire torque multiplication occurs in the first planetary gear unit 156. Shaft 174 and power output shaft 212 receive the carrier torque of the carrier 178.

To establish high speed ratio direct drive operation, both brake bands are released and both multiple disc friction clutch assemblies are applied. The turbine torque is delivered directly to the power output shaft.

During reverse drive operation the auxiliary impeller clutch shown at 60 and 62 is released. The forward brake band 130 is released and the rear brake band 236 is applied. Also, the clutch disc assembly shown at 168 and 170 is released while the clutch disc assembly shown at 144 and 146 is applied. The auxiliary impeller and the torque transfer member 96 now function as a part of a mechanical torque delivery path extending from the turbine, through the auxiliary impeller, through sleeve shaft 100 and through the engaged clutch disc assembly 144 and 146 to the sun gear element. The carrier 216 acts as a reactor member since it is held stationary by the engaged friction brake band 236. Thus, the ring gear 210 and the power output shaft 212 are driven in a reverse direction.

The turbine 64 develops a turbine torque by reason of the toroidal fluid flow in the torus circuit of the converter. This turbine torque is delivered through overrunning coupling 82 to the auxiliary impeller clutch part 58. The auxiliary impeller 50 and the associated torque transfer member 96, with the web portion 102 functioning as spokes that extend through the torus circuit, deliver turbine torque to the sleeve shaft 100. The torque converter thus is effective to establish a hydrokinetic torque multiplication during reverse drive as well as during forward drive.

In contrast with the arrangement in copending application Serial No. 247,222, the power flow path during reverse drive is partially hydrokinetic in character and the effective reverse driving torque ratio is equal to the product of the ratio of the gearing times the hydrokinetic torque ratio of the torque converter. In my previous application the reverse power flow path is entirely mechanical and the over-all ratio is equal to the torque ratio of the gearing only since the torque converter is ineffective to establish torque multiplication hydrokinetically.

Having thus described a preferred form of my invention, what I claim and desire to secure by United States Letters Patent is:

1. In a hydrokinetic power transmission mechanism, a dual range hydrokinetic torque converter, a pair of simple planetary gear units, each gear unit comprising a ring gear, a sun gear, a carrier and planet pinions rotatably journaled upon said carrier in meshing engagement with said sun gear and said ring gear, the carrier of a first of said gear units and the ring gear of a second of said gear units being connected to a driven member, means for anchoring the carrier of said second gear unit to accommodate torque reaction during low speed ratio forward drive operation and reverse drive operation, said sun gears being connected together for rotation in unison, second brake means for anchoring selectively said sun gears, said hydrokinetic torque converter mechanism comprising a bladed impeller, a bladed auxiliary impeller, a turbine and a stator situated in toroidal fluid flow relationship, said auxiliary impeller being located adjacent the flow exit region of said impeller, auxiliary impeller clutch means for clutching selectively said auxiliary impeller to said impeller for joint rotation as a common impeller assembly, selectively engageable clutch means for connecting said sun gears to said auxiliary impeller during high speed ratio operation and reverse drive operation, forward drive clutch means for connecting selectively the ring gear of said first planetary gear unit to said turbine during forward drive operation, and an overrunning coupling means for establishing a driving connection between said turbine and said auxiliary impeller during reverse drive operation when said first mentioned clutch means is disengaged.

2. In a hydrokinetic power transmission mechanism, a dual range hydrokinetic torque converter, a pair of simple planetary gear units, each gear unit comprising a ring gear, a sun gear, a carrier and planet pinions rotatably journaled upon said carrier in mashing engagement with said sun gear and said ring gear, the carrier of a first of said gear units and the ring gear of a second of said gear units being connected to a driven member, means for anchoring the carrier of said second gear unit to accommodate torque reaction during low speed ratio forward drive operation and reverse drive operation, said sun gears being connected together for rotation in unison, second brake means for anchoring selectively said sun gears, said hydrokinetic torque converter mechanism comprising a bladed impeller, a bladed auxiliary impeller, a turbine and a stator situated in a toroidal fluid flow relationship, said auxiliary impeller being located adjacent the flow exit region of said impeller, auxiliary impeller clutch means for clutching selectively said auxiliary impeller to said impeller for joint rotation as a common impeller assembly, selectively engageable clutch means for connecting said sun gears to said auxiliary impeller during high speed ratio operation and reverse drive operation, forward drive clutch means for connecting selectively the ring gear of said first planetary gear unit to said turbine during forward drive operation, and an overrunning coupling means for establishing a driving connection between said turbine and said auxiliary impeller during reverse drive operation when said first mentioned clutch means is disengaged, said auxiliary impeller clutch means being disengaged during operation of said converter mechanism in a high torque ratio performance range, the torque developed by said turbine being distributed through said auxiliary impeller to said sun gears and through said selectively engageable clutch means during reverse drive operation with said auxiliary impeller clutch means disengaged.

3. A power transmission mechanism capable of delivering driving power from an engine to a driven member including a hydrokinetic torque converter mechanism and two simple planetary gear units, each gear unit comprising a sun gear, a ring gear, planet pinions engageable with said sun and ring gears, and a carrier rotatably supporting said pinions, the carrier of a first of said gear units and the ring gear of the other gear unit being connected to said driven member, brake means for anchoring the carrier of said second gear unit to provide torque reaction during reverse drive operation and low speed ratio forward drive operation, additional brake means for anchoring selectively said sun gears during intermediate speed ratio operation, said sun gears being connected together for rotation in unison, said torque converter mechanism comprising a main impeller, an auxiliary impeller, a turbine and a stator situated in toroidal fluid flow relationship, said auxiliary impeller being situated between the flow exit region of said main impeller and the flow entrance region of said turbine, said impeller being connected to said engine, auxiliary impeller clutch means for clutching selectively said auxiliary impeller to said impeller for joint rotation as a common impeller assembly, selectively engageable clutch means for connecting said sun gears to said auxiliary impeller during high speed ratio operation and reverse drive operation, forward drive clutch means for connecting selectively the ring gear of said first planetary gear unit to said turbine during forward drive operation, and an overrunning coupling means for establishing a driving connection between said turbine and said auxiliary impeller during reverse drive operation when said first mentioned clutch means is disengaged.

4. A power transmission mechanism capable of delivering driving power from an engine to a driven member including a hydrokinetic torque converter mechanism and two simple planetary gear units, each gear unit comprising a sun gear, a ring gear, planet pinions engageable with said sun and ring gears, and a carrier rotatably supporting said pinions, the carrier of a first of said gear units and the ring gear of the other gear unit being connected to said driven member, brake means for anchoring the carrier of said second gear unit to provide torque reaction during reverse drive operation and low speed ratio forward drive operation, additional brake means for anchoring selectively said sun gears during intermediate speed ratio operation, said sun gears being connected together for rotation in unison, said torque converter mechanism comprising a main impeller, an auxiliary impeller, a turbine and a stator situated in toroidal fluid flow relationship, selectively engageable first clutch means for connecting said turbine to said gun gears during forward drive operation, said auxiliary impeller being situated between the flow exit region of said main impeller and the flow entrance region of said turbine, said impeller being connected to said engine, selectively engageable impeller clutch means for connecting said auxiliary impeller to said impeller during high efficiency operation of said converter mechanism, said auxiliary impeller clutch means being disengaged during operation of said converter mechanism in a high torque ratio performance range, the torque developed by said turbine being distributed through said auxiliary impeller to said sun gears and through said selectively engageable clutch means during reverse drive operation with said auxiliary impeller clutch means disengaged.

References Cited by the Examiner
UNITED STATES PATENTS

| | | | |
|---|---|---|---|
| 3,083,589 | 4/1963 | Knowles et al. | 74—677 |
| 3,150,541 | 9/1964 | Flinn | 74—677 |
| 3,188,887 | 6/1965 | Gabriel | 74—688 |

DAVID J. WILLIAMOWSKY, *Primary Examiner.*

J. R. BENEFIEL, *Assistant Examiner.*